US012535157B2

(12) United States Patent
Brock et al.

(10) Patent No.: US 12,535,157 B2
(45) Date of Patent: Jan. 27, 2026

(54) CONNECTION ARRANGEMENT DEVICE AND METHOD FOR FLUID LINE

(71) Applicant: TI Group Automotive Systems LLC, Auburn Hills, MI (US)

(72) Inventors: Jonathan Brock, Bloomfield Township, MI (US); Benjamin Allen Sprygada, Battle Creek, MI (US); Timmons Seth, Auburn Hills, MI (US); Matthew Stieber, Grosse Pointe Park, MI (US)

(73) Assignee: TI GROUP AUTOMOTIVE SYSTEMS LLC, Auburn Hills, MI (US)

( * ) Notice: Subject to any disclaimer, the term of this patent is extended or adjusted under 35 U.S.C. 154(b) by 0 days.

(21) Appl. No.: 18/570,871

(22) PCT Filed: Jun. 6, 2022

(86) PCT No.: PCT/IB2022/055262
§ 371 (c)(1),
(2) Date: Dec. 15, 2023

(87) PCT Pub. No.: WO2023/237906
PCT Pub. Date: Dec. 14, 2023

(65) Prior Publication Data
US 2024/0280193 A1 Aug. 22, 2024

(51) Int. Cl.
*F16L 13/02* (2006.01)
*F16L 43/00* (2006.01)
(52) U.S. Cl.
CPC ............. *F16L 13/02* (2013.01); *F16L 43/008* (2013.01)

(58) Field of Classification Search
CPC ....... F16L 13/007; F16L 41/082; F16L 47/26; F16L 47/28; F16L 47/30; F16L 47/005; F16L 47/04; F16L 47/06
(Continued)

(56) References Cited

U.S. PATENT DOCUMENTS 3,018,547 A * 1/1962 Marskell ............... F16L 13/007
285/382.4
4,093,280 A * 6/1978 Yoshizawa ............... F16L 47/24
285/915
(Continued)

FOREIGN PATENT DOCUMENTS

DE 3315764 A1 10/1984
EP 0805296 B1 1/2001
(Continued)

OTHER PUBLICATIONS

International Search Report and Written Opinion dated Jan. 13, 2023.

*Primary Examiner* — David Bochna
(74) *Attorney, Agent, or Firm* — DICKINSON WRIGHT PLLC

(57) ABSTRACT

A connection arrangement device for making a secure connection with at least one tube in a fluid line includes an adapter body having a passage bore forming at least one fluid channel with at least two outlets and a mating block having a cavity with at least one longitudinal channel receiving the adapter body. The adapter body is overmolded to the mating block as a single unit such that the adapter body is securely retained in the mating block. Further, the at least one tube is inserted into one of the at least two outlets and connected with the adapter body in a firmly bonded manner.

20 Claims, 6 Drawing Sheets

(58) Field of Classification Search
USPC .......... 285/208, 206, 205, 209, 294.3, 294.1
See application file for complete search history.

(56) References Cited

U.S. PATENT DOCUMENTS

| | | | | |
|---|---|---|---|---|
| 4,241,878 | A * | 12/1980 | Underwood | B05B 1/00 |
| | | | | 285/293.1 |
| 5,366,257 | A * | 11/1994 | McPherson | F16L 47/32 |
| | | | | 285/392 |
| 5,406,983 | A * | 4/1995 | Chambers | F16L 47/16 |
| | | | | 138/143 |
| 5,507,532 | A * | 4/1996 | Mitsui | F16L 47/32 |
| | | | | 285/294.4 |
| 6,540,868 | B1 | 4/2003 | Kertesz | |
| 7,527,302 | B2 * | 5/2009 | Lewis | F16L 47/24 |
| | | | | 285/286.1 |
| 8,220,126 | B1 * | 7/2012 | Yunk | F16L 47/22 |
| | | | | 285/294.1 |
| 10,463,417 | B2 * | 11/2019 | Moreau | F16L 25/14 |
| 2003/0024638 | A1 | 2/2003 | Jones | |
| 2008/0315457 | A1 * | 12/2008 | Ueki | F16L 47/28 |
| | | | | 285/332 |
| 2013/0277964 | A1 * | 10/2013 | Kieper | F16L 47/04 |
| | | | | 285/354 |
| 2015/0354555 | A1 | 12/2015 | Gledhill, III et al. | |
| 2019/0389105 | A1 * | 12/2019 | Nomizo | F16L 47/24 |
| 2020/0124210 | A1 | 4/2020 | Blomberg | |
| 2022/0153088 | A1 * | 5/2022 | Choi | F16L 47/28 |
| 2023/0175627 | A1 * | 6/2023 | Garcia | F16L 47/28 |
| | | | | 285/61 |

FOREIGN PATENT DOCUMENTS

| | | |
|---|---|---|
| JP | 2001047528 A | 2/2001 |
| JP | 2004011419 A | 1/2004 |

* cited by examiner

CONNECTION ARRANGEMENT DEVICE AND METHOD FOR FLUID LINE

RELATED APPLICATIONS

The present disclosure is a national phase application of PCT Application PCT/IB2022/055262, filed Jun. 6, 2022 the entire contents of which is incorporated herein by reference.

FIELD

The present disclosure relates to a connection arrangement in a fluid line assembly. In particular, the present disclosure relates to the connection arrangement having an adapter with a mating block for making a secure connection in a motor vehicle.

BACKGROUND

The statements in this section merely provide background information related to the present disclosure and may not constitute prior art.

Connection arrangements are generally used in a fluid line assembly in a motor vehicle. In particular, the connection arrangements are used in air conditioning systems, cooling systems (e.g., coolant circuits), valve units, and pump units. The design has to be particularly compact and lightweight in a limited space, and also the pipe or tube connections in the air conditioning systems may be comprised of metallic, rubber, and plastic materials. In addition, the pipe or tubes are attached via adapters, which are provided with sealing elements. Accordingly, it is necessary to connect the adapters firmly and with durable sealing both to the pipe and detachably to a further pipe or to another component in the air conditioning system. However, in addition to high pressures and temperatures, vibrations occur and are transmitted within the components of the air conditioning system. The connection arrangements used in the air conditioning system, therefore, have to be constructed in such a way that a durable connection is provided in spite of vibrations and high pressures, and that fluid leakage cannot occur.

Generally, it is important that the fluid line system such as the air conditioning system in the motor vehicle is constructed to be lightweight and also durable in a limited space. However, we have discovered that the number of fastening means fixing together the components of the fluid line system are limited, and also it is difficult to configure the adapters for providing durable sealing of the connection arrangements for making a secure connection in the fluid line system. To effectively arrange the sealed and secured fluid line in the vehicle, a number of devices and methods for the connection arrangements are continuously developed and used in various fluid line systems.

BRIEF SUMMARY

The present disclosure relates to a connection arrangement device for making a secure connection with at least one tube in a fluid line. The connection arrangement device of the present disclosure makes it possible to produce a stable and durable connection with a light weight in a fluid line system such as an air conditioning system in a vehicle. According to one aspect of the present disclosure, the connection arrangement device includes an adapter body having a passage bore forming at least one fluid channel with at least two outlets and a mating block having a cavity with at least one longitudinal channel receiving the adapter body. Further, the adapter body is overmolded to the mating block as a single unit such that the adapter body is securely retained in the mating block.

According to a further aspect of the present disclosure, the adapter body is molded in the cavity and also through the at least one longitudinal channel of the mating block. The adapter body includes an adapter bead molded to the mating block. The at least one longitudinal channel of the mating block has a first dimension and the adapter bead has a second dimension, which is greater than the first dimension. The adapter body forms a main body having an outer surface flushed with a first surface of the mating block when the adapter body is overmolded to the mating block. Further, the adapter body forms an annular channel opening radially and outwardly to receive the mating block between the main body and an adapter bead of the adapter body. The overmolded adapter is vertically and/or longitudinally restrained relative to the mating block.

According to a further aspect of the present disclosure, the adapter body includes a first outlet and a second outlet formed in a straight-flow direction or angled to change a flow direction in the fluid line. The adapter body includes a first outlet, a second outlet, and a third outlet and each of the second and third outlets is substantially perpendicular to the first outlet. Flow directions of the second outlet and the third outlet are opposite to each other.

According to a further aspect of the present disclosure, the cavity of the mating block includes a cavity bottom surface and a cavity side surface substantially perpendicular to the cavity bottom surface. The mating block includes a recess formed on the cavity bottom surface to receive the adapter body overmolded to the mating block. The adapter body includes an adapter flange molded to the recess such that an outer surface of the adapter flange is flushed with the cavity bottom surface of the mating block. When the adapter body is overmolded to the mating block, the at least one longitudinal channel of the mating block has a first dimension and the adapter flange has a third dimension, which is greater than the first dimension such that the adapter body is securely retained in the mating block.

According to a further aspect of the present disclosure, the adapter body includes at least one rib formed in the main body of the adapter body to prevent creep of the adapter body. The mating block includes at least one through hole for receiving a fastening element to attach the mating block to a fluid line system component. Further, at least one tube or hose is inserted into each outlet of the adapter body and connected to the adapter body in a firmly bonded manner.

According to a further aspect of the present disclosure, the adapter body is formed of a polymer material and the mating block is formed of a metallic material.

According to another aspect of the present disclosure, a method of a connection arrangement with at least one tube for making a secure connection in a fluid line, the method comprises of the steps of providing a mating block having a cavity with at least one longitudinal channel, overmolding an adapter body having at least two outlets to the mating block such that the adapter body is securely retained in the mating block as a single unit, and inserting an end of the at least one tube into one of the at least two outlets and connecting the inserted tube with an adapter body in a firmly bonded manner.

According to a further aspect of the present disclosure, the adapter body molded in the cavity and also through the at least one longitudinal channel of the mating block. Further, the step of overmolding the adapter body to the mating block includes the step of forming an adapter bead to be molded to the mating block.

According to a further aspect of the present disclosure, the mating block includes a recess formed in a cavity bottom surface of the mating block. Further, the step of overmolding adapter body to the mating block includes the step of forming an adapter flange to be molded to the recess of the mating block.

According to a further aspect of the present disclosure, the method further includes the step of mounting the mating block securely coupled with adapter body in the fluid line by a fastening element via a through hole of the mating block.

Further details and benefits will become apparent from the following detailed description of the appended drawings. The drawings are provided herewith purely for illustrative purposes and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
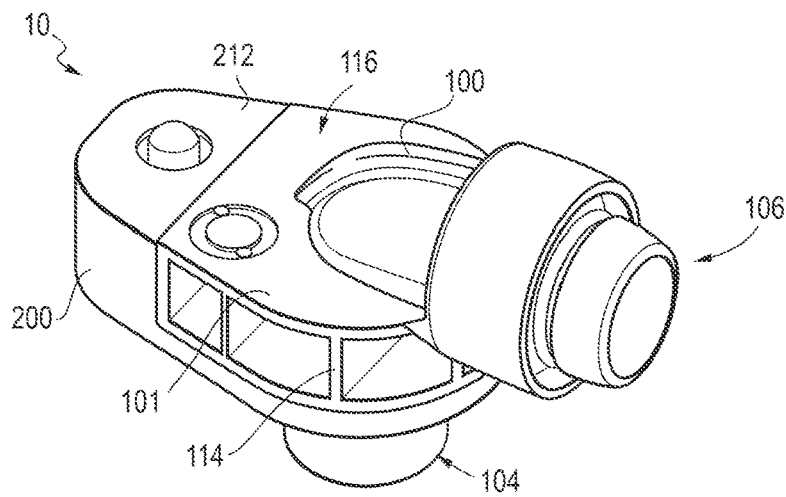
FIG. 1 shows a perspective view of a connection arrangement device including an adapter body and a mating block in accordance with the first embodiment of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

A connection arrangement device of the present disclosure is illustrated in connection with a fluid line system such as an air conditioning system or a cooling system, etc. in a motor vehicle. As an example, the connection arrangement device of the present disclosure is used in an air conditioning system having a compressor, a condenser, heat exchangers, evaporators, and also midline connections. In particular, the connection arrangement device is provided for the air conditioning system having a low weight, and having a durable and tight connection of the components of the air conditioning system in the motor vehicle (i.e., inhibiting leak in the connection of the components). However, the connection arrangement device of the present disclosure is not limited and is also used in other fluid line systems such as cooling systems (e.g., coolant circuits), valve units, pump units, etc.

Figure 2:
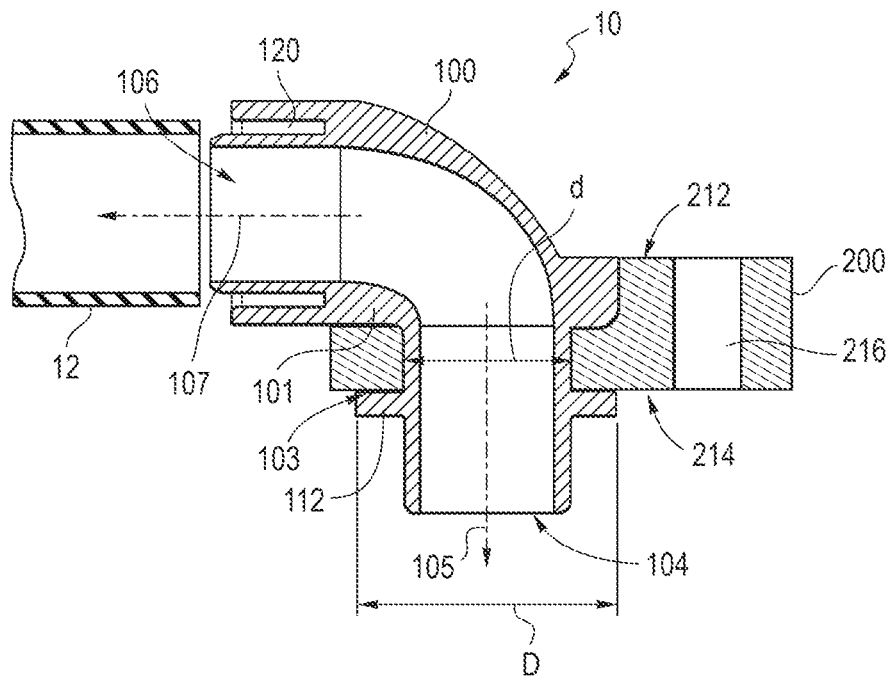
FIG. 2 shows a side sectional view of the connection arrangement device, taken along line A-A in FIG. 1A.
Figure 2A:
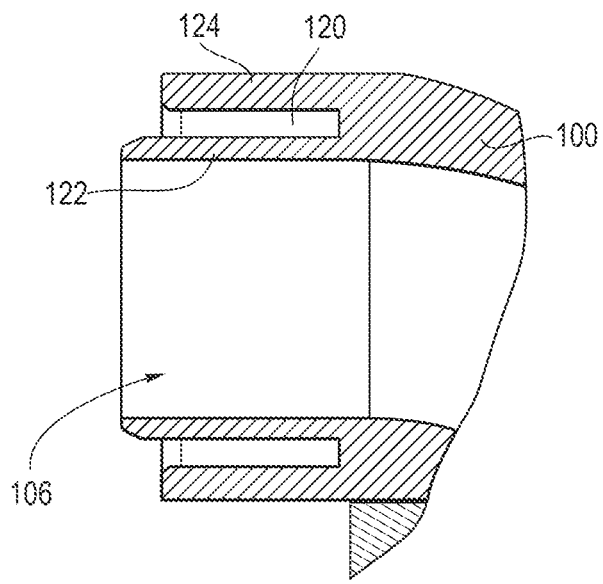
FIG. 2A shows a detailed view of an adapter body in the connection arrangement device of FIG. 2.

FIGS. 1 and 2 show the first embodiment of the connection arrangement device 10 having at least one adapter body 100 and a mating block 200 coupled with the adapter body 100. Generally, the connection arrangement device 10 is fixed to a fluid line system such as an air conditioning system (not shown) by a fastening element for a fluid line such as a refrigerant in an automotive vehicle. As shown in FIGS. 1 and 2, the adapter body 100 has a passage bore 102 formed as a fluid channel, and includes at least two outlets such as a first outlet 104 and a second outlet 106 formed at each end of the adapter body 100 such that the first outlet 104 communicates with the second outlet 106 through the fluid channel 102. Each of the first and second outlets 104 and 106 is generally connected with a tube or hose 12 for making a secure connection in the fluid line system. In another approach, the adapter body 100 includes three and more outlets (see FIGS. 3 and 4) such that it is not limited to two outlets. As shown in FIG. 2A, the second outlet 106 of the adapter body 100 is in a form of a shallow-cylindrical reception 120 to receive the tube 12 to be connected by a firmly bonded manner, in particular by a laser welding, a spin welding, and other adhesive materials such that the tube is inserted into the reception 120 of the second outlet 106, and is securely connected to the adapter body 100. In FIGS. 2 and 2A, for example, the second outlet 106 of the adapter body 100 has an inner wall 122 and an outer wall 124, which are formed the shallow-cylindrical reception 120 to receive the tube 12. While the first and second apertures 104 and 106 have both been labelled as 'outlets', the skilled artisan will recognize that one or both apertures could be considered to be 'inlets'. That is, a tube connected to the first outlet 104 may deliver fluid to the connection arrangement device 10, whereby the fluid flows through the passage 102 to the second outlet 106 and any tube connected thereto (as well as any additional outlets, such as described in later embodiments below). Likewise, a tube connected to the second outlet 106 may deliver fluid to the connection arrangement device 10, whereby the fluid flows through the passage 102 to the first outlet 104 and any tube connected thereto. Since the arrangement device 10 is flexible and adaptable in this manner, each of the apertures 104 and 106 will be referred to herein an outlet for simplicity, but may also be considered to be an inlet based on the chosen arrangement.

As shown in FIG. 2, the adapter body 100 includes the first outlet 104 and the second outlet 106 which are angled by 90 degrees for changing a flow direction. In accordance with other forms of the present disclosure, the angle formed by the first outlet 104 and the second outlet 106 may be changed to create a desired flow direction such as 45 degrees, 90 degrees, or 180 degrees (a straight-flow direction, see FIGS. 5 and 6), etc. As shown in an example of FIG. 2, a first flow direction 105 is defined along the first outlet 104 and a second flow direction 107 is defined along the second outlet 106 such that the first flow direction 105 and the second flow direction 107 are perpendicular because the first outlet 104 and the second outlet 106 are angled by 90 degrees.

Figure 1A:
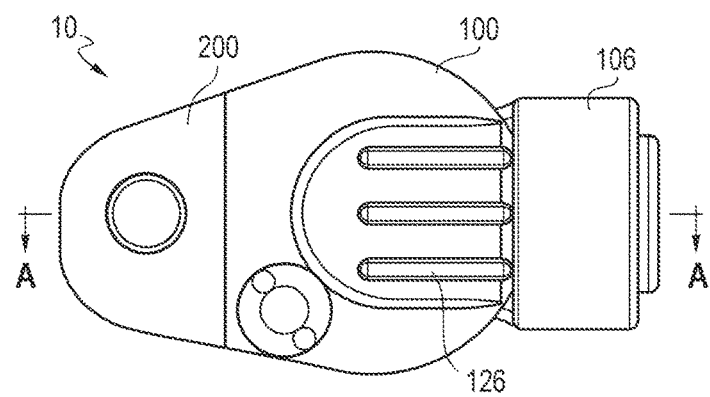
FIG. 1A shows a top view of the connection arrangement device of FIG. 1.
Figure 1B:
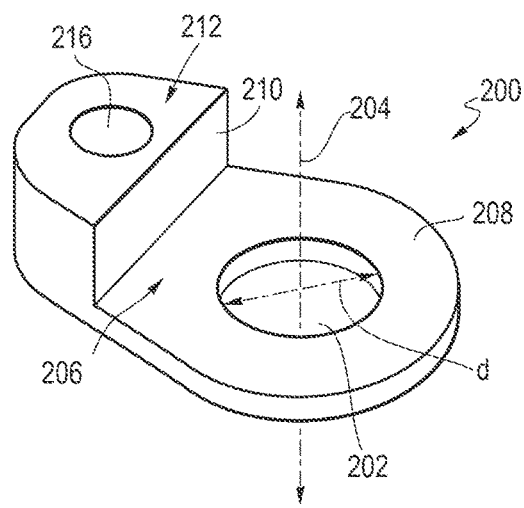
FIG. 1B shows a perspective view of the mating block in the connection arrangement device of FIG. 1.

FIGS. 1 and 1B further show the mating block 200 having at least one longitudinal channel 202 formed along a longitudinal axis 204 to receive and couple with the adapter body 100. For example, FIG. 1B shows the mating block 200 having one longitudinal channel 202 formed with a circular shape, but in another approach, the mating block 200 can have more than one longitudinal channel. The longitudinal channel 202 is preferably formed as a through hole or bore as shown in FIG. 1B, and extends from an upper surface (i.e., a cavity bottom surface) to a lower surface (i.e., a second surface) of the mating block 200. As shown in FIGS. 1 and 1B, the mating block 200 includes a cavity 206 to receive and support a main body 101 of the adapter body 100 when the adapter body 100 is securely coupled with the mating block 200. The cavity 206 of the mating block 200 is formed with an L-shape having a cavity bottom surface 208 and a cavity side surface 210, which is perpendicular to the cavity bottom surface 208. However, in accordance with other forms of the present disclosure, the cavity bottom surface 208 and the cavity side surface 210 could be substantially perpendicular, but they could not be necessarily perpendicular (i.e., less than 90 degrees or more than 90 degrees) from each other. Stated another way, the cavity 206 can be a reduced thickness portion of the mating block 200. In general, when the adapter body 100 is overmolded to the mating block 200, the material of the adapter body 100 is filled in the cavity 206 such that the adapter body 100 forms the main body 101 molded to the cavity bottom and side surfaces 208 and 210. As shown in FIG. 2, accordingly, a portion of the mating block 200 is arranged between the main body 101 and the adapter bead 112 of the adapter body 100 such that the adapter body 100 is securely engaged with the mating block 200 as a single component.

In FIG. 2, the mating block 200 further includes at least one through hole 216 for mounting and fixing to the fluid line system by a fastening element such as a screw. Further, the mating block 200 is made of a metallic material such as an aluminum or a polymer material. In particular, the material of the mating block 200 is rigid and has a high stress capacity such that the material of the mating block 200 inhibits plastic deformation by limiting creep caused by the joint assembly torque. The through hole 216 is laterally spaced from the longitudinal channel 202, the cavity 206, and the adapter body 100, i.e. relative to the longitudinal axis 204.

In accordance with the first embodiment of the present disclosure, as shown in FIGS. 1 and 2, the adapter body 100 is preferably made from a plastic material, and the adapter body 100 is overmolded to the mating block 200 as a single unit such that the adapter body 100 is securely retained in the mating block 200 as a single component. Accordingly, the overmolded adapter body 100 will not be separated or rotated from the mating block 200 such that the adapter body 100 overmolded to the mating block 200 is generally used as a torque limiter and orientation fixation. As shown in FIG. 2, when the adapter body 100 is overmolded to the mating block 200, the material of the adapter body 100 is molded through the longitudinal channel 202 of the mating block 200 and also molded in the cavity 206 of the mating block 200. In particular, the adapter body 100 includes an adapter bead 112 molded to the mating block 200 and formed around the first outlet 104 of the adapter body 100. Further, the main body 101 of the adapter body 100 is formed in the cavity 206 of the mating block 200 and the adapter bead 112 is coupled to the second surface 214 of the mating block 200 such that a portion of the mating block 200 is positioned between the main body 101 and the adapter bead 112 of the adapter body 100.

As shown in FIG. 2, further, a diameter D of the adapter bead 112 is greater than a diameter d of the longitudinal channel 202 of the mating block 200 such that the overmolded adapter body 100 is securely retained in the mating block 200. That is, an annular channel 103 is formed between the main body 101 and the adapter bead 112 which closely receives the mating block 200 in the area of the longitudinal channel 202. The annular channel 103 of the adapter body 100 opens radially and outwardly to receive the mating block 200. In this way, the adapter body 100 is vertically and/or longitudinally restrained such that it cannot move longitudinally (i.e., along the longitudinal axis 204) relative to the mating block 200. The longitudinal channel 202 may also be formed to asymmetrical, non-circular, or to have radially projecting portions such that the adapter body 100 is also rotationally restrained relative to the mating block 200. In this embodiment, the shape of the cavity 206 to which the adapter body 100 is molded, and namely the cavity side surface 210, also serves to rotationally restrain the adapter body 100 relative to the mating block 200. Together, the adapter body 100 and the mating block 200 form an integral or unitary piece or part.

Further, the adapter body 100 is formed of polymer materials such as polyamide (PA), for example polyamide 612 (PA 612), PA 6, PPA, PA 12, PPS, etc. Also, to increase the strength and/or mechanical stability, the plastic material can be provided with fiber reinforcement such as glass fibers such that the adapter body 100 is formed with a pressure-resistant plastic material. Further, it is also possible to have a resin-based plastic material. The resin-based plastic materials result in hard, glass-like components, which are firmly three-dimensionally cross-linked via chemical bonds. This type of materials have a high thermomechanical strength in conjunction with a low density.

In addition, the tube 12 combined with the adapter body 100 in the connection arrangement device 10 is also made from a plastic material, which is selected from the similar materials of the adapter body 100, for example polyamide (PA). Further, the adapter body 100 of the connection arrangement device 10 is usually combined with multilayer tubes with outer (or inner) layer of materials, which are compatible with regard to welding (e.g., laser welding or spin welding). However, even though the polyamide (PA) is used for the adapter body 100, and the tube, each of the polyamide (PA) materials used in both parts might be different. In the fluid line system, the tube can be a single or multilayer tube, which is generally made of Polyamide (PA 6, PA 12, PA 612, semi-aromatic polyamide (PA 9T), HDPE, PP, etc.), which is weldable with the adaptor body. However, the adaptor body is generally made of PA12 (with max 30% glass fiber reinforcements), PPA (Polyphthalamide) or PP (Polypropylene). This results in comparable mechanical and chemical properties.

Referring back to FIG. 1, the main body 101 of the adapter body 100 includes at least one rib 114, which is configured for inhibiting creep of the adapter body 100 (i.e., improving mechanical stability and also weight reduction of the adapter body 100) when the connection arrangement device 10 is mounted to a cooling system, which is operated in the vehicle. Further, as shown in FIGS. 1 and 2, the outer surface 116 of the main body 101 is flushed with a first surface 212 of the mating block 200 when the adapter body 100 is securely coupled with the mating block 200. In addition, as shown in FIG. 1A, the adapter body 100 has at least one protrusion 126 protruding from the second outlet 106 along the second flow direction 107 to inhibit creep or deformation of the second outlet 106 of the adapter body 100 when used in the vehicle.

Figure 3:
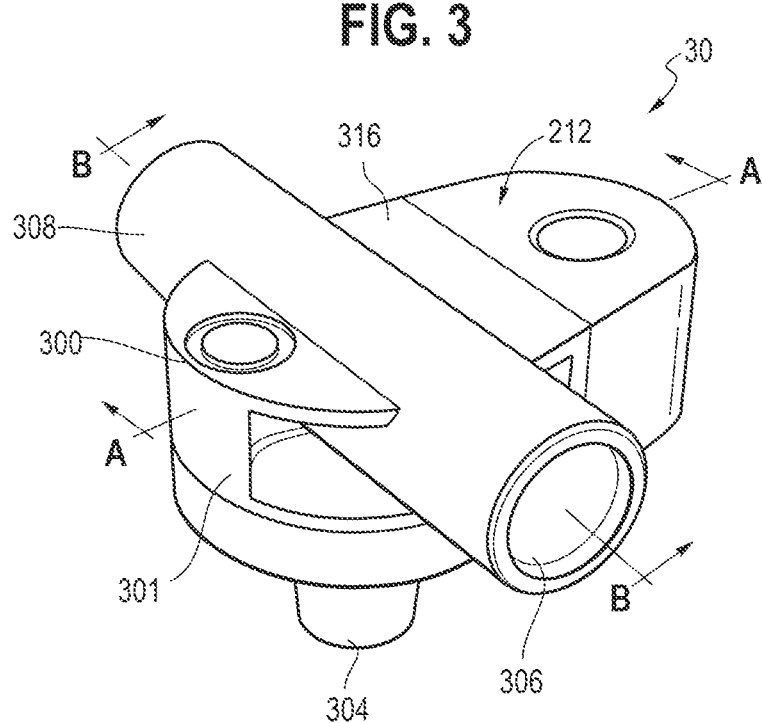
FIG. 3 shows a perspective view of a connection arrangement device including an adapter body and a mating block in accordance with the second embodiment of the present disclosure.
Figure 4A:
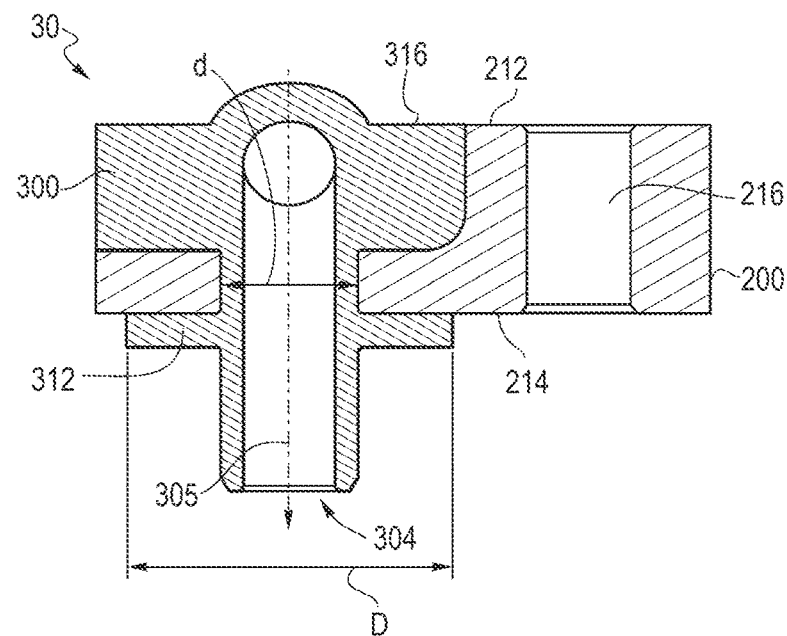
FIG. 4A shows a side sectional view of the connection arrangement device, taken along line A-A in FIG. 3.

FIGS. 3 and 4A show a second embodiment of the connection arrangement device 30. Features of the first embodiment, even if not explicitly mentioned below, may be or are applied to this second embodiment, and vice versa. As shown in FIGS. 3 and 4A, the adapter body 300 is different from the adapter body 100 of the first embodiment of the connection arrangement device 10. The adapter body 300 in the second embodiment of the connection arrangement device 30 includes a first outlet 304 having a first flow direction 305, a second outlet 306 having a second flow direction 307, and a third outlet 308 having a third flow direction 309 such that the adapter body 300 having three outlets is different from the adapter body 100 having two outlets. As shown in FIGS. 1 and 3, however, the mating block 200 in the first and second embodiments of the connection arrangement devices 10 and 30 are identical.

Figure 4B:
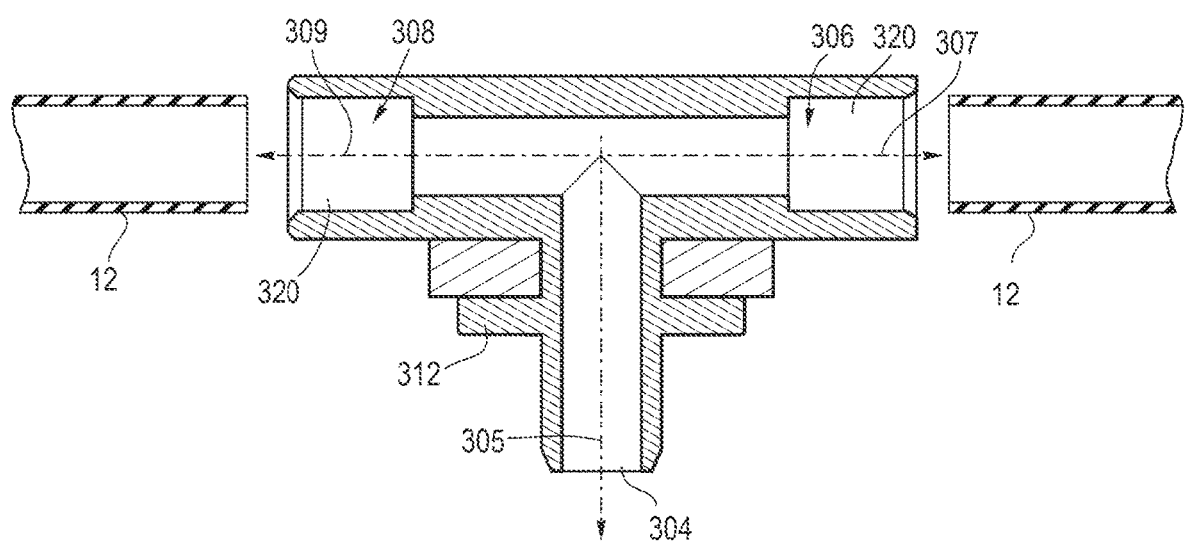
FIG. 4B shows another side sectional view of the connection arrangement device, taken along line B-B in FIG. 3.

As shown in FIGS. 3 and 4A, the first flow direction 305 of the first outlet 304 is defined along with the longitudinal axis 204 of the mating block 200, which is the same as the first flow direction 105 of the adapter body 100. In FIGS. 3 and 4A, however, the adapter body 300 includes one additional outlet, which is the third outlet 308. In accordance with other forms of the present disclosure, for example, the adapter body 100 has more than three outlets such that the adapter body 100 can have the first, second third, fourth outlets, etc. As shown in FIG. 3, for example, the adapter body 300 includes three outlets 304, 306, and 308 each having its flow direction. The second flow direction 307 defined in the second outlet 306 and the third flow direction 309 defined in the third outlet 308 are each perpendicular to the first flow direction 305 defined in the first outlet 304. Further, the second and third outlets 306 and 308 are in a common passage, but the flow directions of the second and third outlets 306 and 308 are opposite to each other such that the fluid in the second and third outlets 306 and 308 flows in the opposite direction. Accordingly, as shown in FIGS. 3 and 4B, the adapter body 300 having three outlets is overmolded to the mating block 200 as a single unit such that the adapter body 300 is securely retained in the mating block 200 without the separation or rotational movement when the connection arrangement device 30 having the adapter body 300 overmolded to the mating block 200 is mounted to the cooling system, which is operated in the vehicle. In FIG. 4B, further, the adapter body 300 having three outlets 304, 306, and 308 is formed with a T-shape. In accordance with other forms of the present disclosure, the adapter body 300 having the three outlets 304, 306, and 308 could be formed with a Y-shape, a star-shape, etc.

Figure 3A:
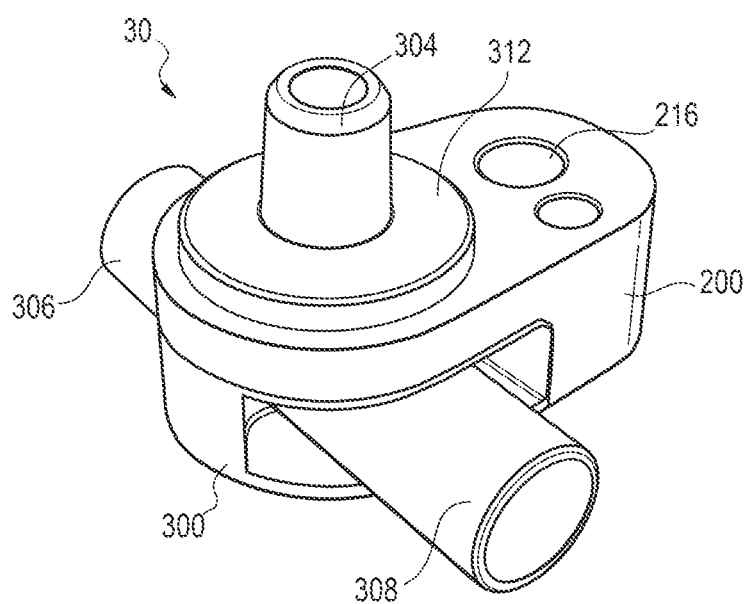
FIG. 3A shows another perspective view of the connection arrangement device of FIG. 3.

In FIGS. 3 and 3A, the adapter body 300 further includes an adapter bead 312 radially formed around the first outlet 302 of the adapter body 300 and also molded to the mating block 200. Further, the main body 301 of the adapter body 300 has an outer surface 316, which is flushed with the first surface 212 of the mating block 200 when the adapter body 100 is overmolded to the mating block 200. In FIGS. 4A and 4B, the material of the adapter body 300 is filled in the cavity 206 of the mating block 200, and the adapter bead 312 is molded to the second surface 214 of the mating block 200 such that a portion of the mating block 200 is positioned between the main body 301 and the adapter bead 312 of the adapter body 300. Accordingly, the adapter body 300 in the second embodiment of the connection arrangement device 30 is securely retained in the mating block 200 as a single component.

As shown in FIG. 4A, further, the diameter D of the adapter bead 312 is greater than the diameter d of the longitudinal channel 202 formed in the mating block 200 such that the adapter body 300 is securely retained in the mating block 200. In addition, each of the second and third outlets 306 and 308 is in a form of a hollow-cylindrical reception 320 to receive the tube 12 to be connected by a firmly bonded manner, in particular by a laser welding, a spin welding, and other adhesive materials such that the tube 12 is inserted into each of the second and third outlets 306 and 308, and is securely connected to the adapter body 300.

Figure 5:
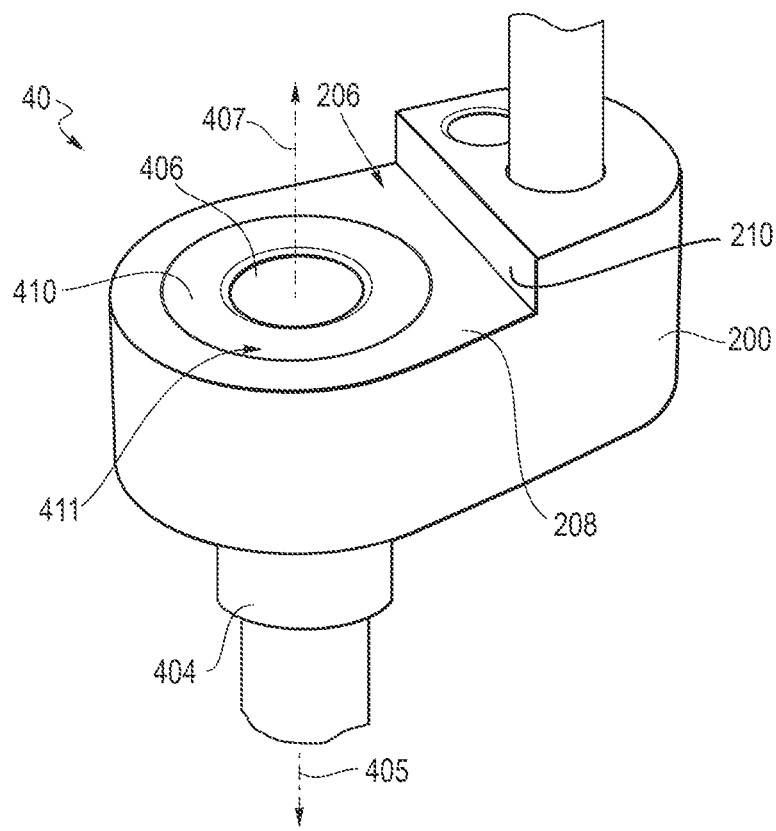
FIG. 5 shows a perspective view of a connection arrangement device including an adapter body and a mating block in accordance with the third embodiment of the present disclosure.
Figure 6:
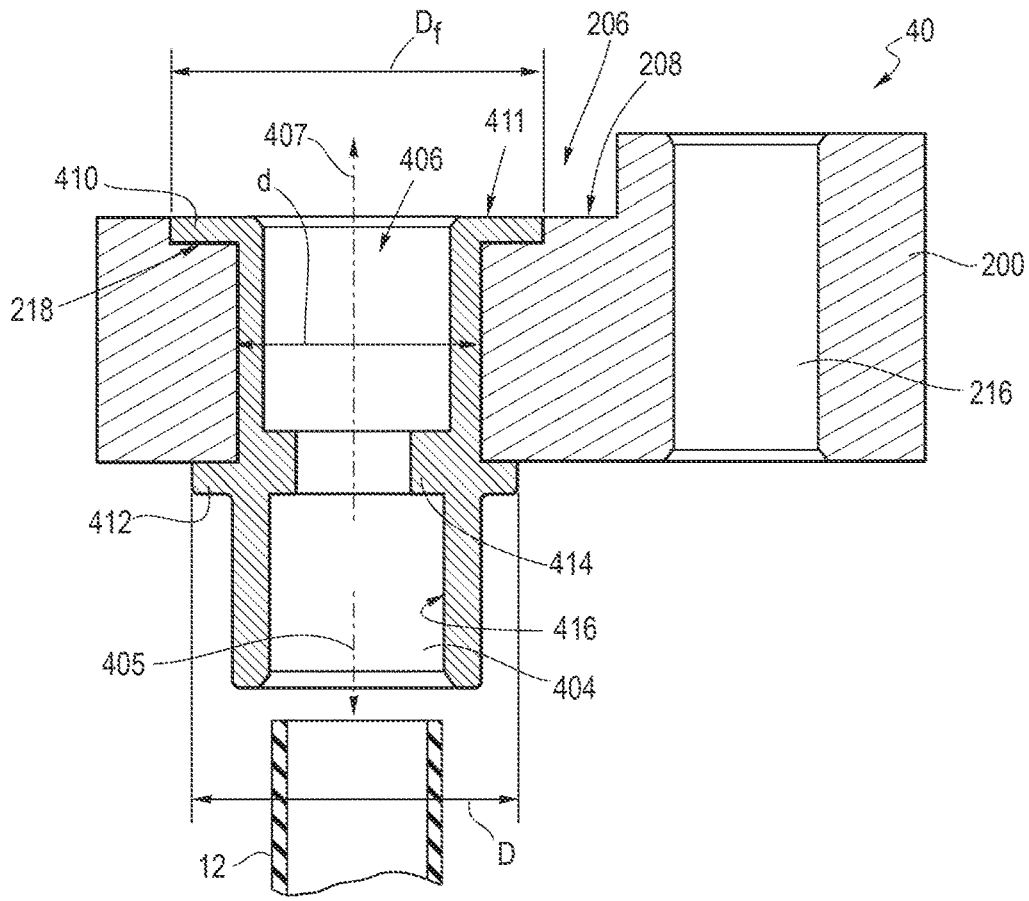
FIG. 6 shows a side sectional view of the connection arrangement device, taken along line A-A in FIG. 5A.

FIGS. 5 and 6 show a third embodiment of the connection arrangement device 40. Features of the first and second embodiments, even if not explicitly mentioned below, may be or are applied to this third embodiment, and vice versa. As shown in FIGS. 5 and 6, the adapter body 400 includes a first outlet 404 having a first flow direction 405 and a second outlet 406 having a second flow direction 407, and both flow directions 405 and 407 are in a single straight-flow direction along with the longitudinal axis 204 of the mating block 200. Further, the adapter body 400 is overmolded to the mating block 200 as a single unit such that the adapter body 400 is securely retained in the mating block 200.

Figure 5A:
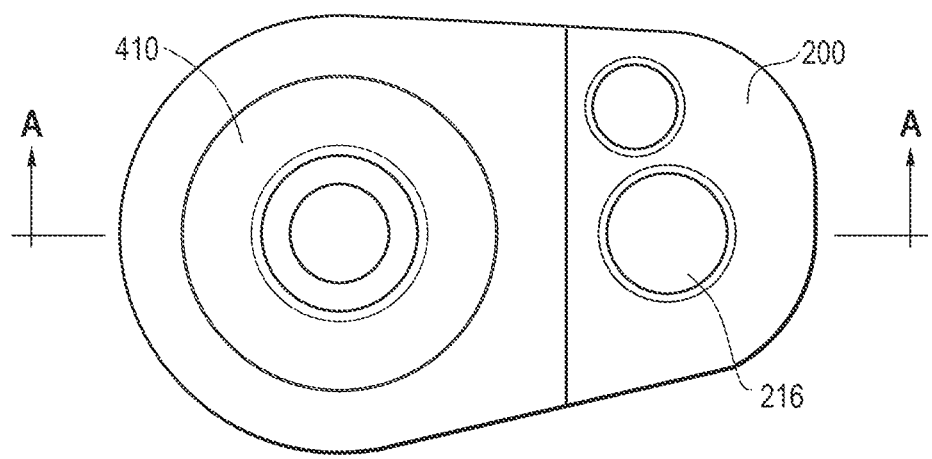
FIG. 5A shows a top view of the connection arrangement device of FIG. 5.

In the third embodiment of the connection arrangement device 40, as shown in FIG. 6, the mating block 200 includes an annular recess 218 formed on the cavity bottom surface 208 to receive the adapter body 400. As in the first and second embodiments of the connection arrangement device 10 and 30, the adapter body 400 is also overmolded to the mating block 200 such that the adapter body 400 is securely retained in the mating block 200. However, the adapter body 400 in the third embodiment of the connection arrangement device 40 is not filled in the cavity 206 of the mating block 200. Instead, the material of the adapter body 400 is filled in the annular recess 218 of the mating block 200 and forms an annular flange 410 to be molded in the annular recess 218 (see FIG. 5A). Further, an outer surface 411 of the annular flange 410 is flushed with the cavity bottom surface 208 of the mating block 200.

Figure 6A:
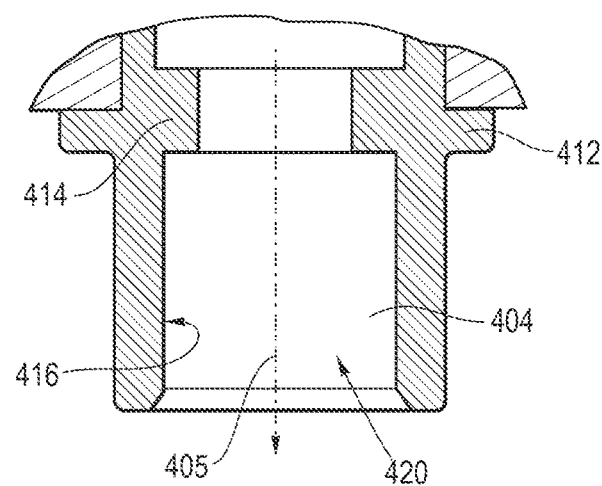
FIG. 6A shows a detailed view of an adapter body in the connection arrangement device of FIG. 6.

In FIGS. 6 and 6A, the adapter bead 412 formed around the first outlet 404 is molded to the second surface 214 of the mating block 200 such that a portion of the mating block 200 is positioned between the annular flange 410 and the adapter bead 412 of the adapter body 400. Accordingly, the adapter body 400 in the third embodiment of the connection arrangement device 40 is securely retained in the mating block 200 as a single component. Further, as shown in FIGS. 6 and 6A, the adapter body 400 has an annular protrusion 414 protruding from an inner surface 416 of the fluid channel 402 to stop an end of a tube 12 or a connector (not shown) when the connector or tube 12 is inserted into each of the first and second outlets 404 and 406.

As shown in FIG. 6, the diameters Df of the annular flange 410 and the diameter D of the adapter bead 412 are each greater than the diameter d of the longitudinal channel 202 of the mating block 200 such that the adapter body 400 overmolded to the mating block 200 is securely engaged with the mating block 200. In FIGS. 6 and 6A, the first outlet 404 is in form of a hollow-cylindrical reception 420 to receive the tube 12 to be connected by a firmly bonded manner, in particular by a laser welding, a spin welding, and other adhesive materials such that the tube is inserted into the first outlet 404, and is securely connected to the adapter body 300.

The connection arrangement devices 10, 30, and 40 according to the first, second, and third embodiments of the present disclosure, are suitable for various fluid line systems such as an air conditioning system or a cooling system in motor vehicles. For example, the connection arrangement devices 10, 30, and 40 are suitable for cooling systems of hybrid or electric vehicles having cooling/tempering electronic components such as batteries and also air conditioning systems. Further, the fluid line systems used in the vehicles should be lightweight as much as possible, but the fluid line systems are also provided with stable connections among the components because of the vibrations and shocks while the vehicles are operated. Accordingly, the connection arrangement devices 10, 30, and 40 of the present disclosure make it possible to produce a stable and durable connection with a light weight.

The foregoing description of various forms of the disclosure has been presented for purposes of illustration and description. It is not intended to be exhaustive or to limit the disclosure to the precise forms disclosed. Numerous modifications or variations are possible in light of the above teachings. The forms discussed were chosen and described to provide the best illustration of the principles of the disclosure and its practical application to thereby enable one of ordinary skill in the art to utilize the disclosure in various forms and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A connection arrangement device for making a secure connection with at least one tube in a fluid line, the connection arrangement device comprising:
   an adapter body having a passage bore forming at least one fluid channel with at least two outlets; and
   a mating block having a first surface being an uppermost surface, a second surface being a lowermost surface, and a cavity extending through the uppermost surface to define a cavity bottom surface that is below the uppermost surface and opposite the lowermost surface, the mating block having at least one longitudinal channel receiving the adapter body,
   wherein the adapter body is overmolded to the mating block as a single unit such that the adapter body extends transversely along the cavity bottom surface and the lowermost surface to securely retain the adapter body in the cavity of the mating block, and
   wherein the adapter body forms a main body having an outer surface flushed with the first surface of the mating block when the adapter body is overmolded to the mating block.

2. The connection arrangement device of claim 1, wherein the adapter body is molded in the cavity and also through the at least one longitudinal channel of the mating block.

3. The connection arrangement device of claim 1, wherein the adapter body includes an adapter bead molded to the mating block.

4. The connection arrangement device of claim 3, wherein the at least one longitudinal channel of the mating block has a first dimension, and the adapter bead of the adapter body has a second dimension greater than the first dimension.

5. The connecting arrangement device of claim 1, wherein the adapter body forms an annular channel opening radially and outwardly to receive the mating block between the main body and an adapter bead of the adapter body.

6. The connecting arrangement device of claim 1, wherein the overmolded adapter body is vertically and/or longitudinally restrained relative to the mating block.

7. The connection arrangement device of claim 1, wherein the adapter body includes a first outlet, a second outlet, and a third outlet, and each of the second outlet and the third outlet is substantially perpendicular to the first outlet.

8. The connection arrangement device of claim 7, wherein flow directions of the second outlet and the third outlet are opposite to each other.

9. The connection arrangement device of claim 1, wherein the cavity of the mating block includes the cavity bottom surface and a cavity side surface substantially perpendicular to the cavity bottom surface.

10. The connection arrangement device of claim 9, wherein the mating block includes a recess formed on the cavity bottom surface to receive the adapter body overmolded to the mating block.

11. The connection arrangement device of claim 10, wherein the adapter body includes an adapter flange molded to the recess such that an outer surface of the adapter flange is flushed with the cavity bottom surface of the mating block.

12. The connection arrangement device of claim 11, wherein when the adapter body is overmolded to the mating block, the at least one longitudinal channel of the mating block has a first dimension and the adapter flange has a third dimension greater than the first dimension such that the adapter body is securely retained in the mating block.

13. The connection arrangement device of claim 1, wherein the adapter body includes at least one rib formed in a main body of the adapter body to prevent creep of the adapter body.

14. The connection arrangement device of claim 1, wherein the adapter body is formed of a polymer material, and the mating block is formed of a metallic material.

15. The connection arrangement device of claim 1, wherein the mating block comprises a through hole laterally spaced apart from the at least one longitudinal channel and configured for mounting or fixing to the fluid line system.

16. A method of a connection arrangement with at least one tube for making a secure connection in a fluid line, the method comprising the steps of:
   providing a mating block having a first surface being an uppermost surface, a second surface being a lowermost surface, and a cavity extending through the uppermost surface to define a cavity bottom surface that is below the uppermost surface and opposite the lowermost surface, the mating block having at least one longitudinal channel;
   overmolding an adapter body having at least two outlets to the mating block such that the adapter body extends transversely along the cavity bottom surface and the lowermost surface to securely retain the adapter body in the cavity of the mating block as a single unit, and forms a main body having an outer surface flushed with the first surface of the mating block; and
   inserting an end of the at least one tube into one of the at least two outlets and connecting the inserted tube with the adapter body in a firmly bonded manner.

17. The method of claim 16, wherein the adapter body is molded in the cavity and also through the at least one longitudinal channel of the mating block.

18. The method of claim 16, wherein the step of overmolding the adapter body to the mating block includes the step of forming an adapter bead to be molded to the mating block.

19. The method of claim 18, wherein the adapter body includes an annular channel opening radially and outwardly to receive the mating block between the cavity and the adapter bead.

20. The method of claim 16, wherein the mating block includes a recess formed in the cavity bottom surface of the mating block, and wherein the step of overmolding the adapter body to the mating block includes the step of forming an adapter flange to be molded to the recess of the mating block.

* * * * *